United States Patent
Koltay et al.

(10) Patent No.: US 7,887,621 B2
(45) Date of Patent: Feb. 15, 2011

(54) DEVICE WITH A CHANNEL CONDUCTING A FLOWABLE MEDIUM AND A METHOD FOR REMOVING INCLUSIONS

(75) Inventors: Peter Koltay, Freiburg (DE); Christian Litterst, Frankfurt am Main (DE); Steffen Eccarius, Freiburg (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 681 days.

(21) Appl. No.: 11/883,259

(22) PCT Filed: Jan. 31, 2006

(86) PCT No.: PCT/EP2006/000990

§ 371 (c)(1),
(2), (4) Date: Nov. 6, 2007

(87) PCT Pub. No.: WO2006/082087

PCT Pub. Date: Aug. 10, 2006

(65) Prior Publication Data

US 2008/0141861 A1    Jun. 19, 2008

(30) Foreign Application Priority Data

Jan. 31, 2005    (DE) .................. 10 2005 005 231

(51) Int. Cl.
    *B01D 19/00* (2006.01)
(52) U.S. Cl. .......................... 95/260; 96/204
(58) Field of Classification Search ............. 95/260, 95/241; 96/204, 155
    See application file for complete search history.

(56) References Cited

U.S. PATENT DOCUMENTS

| 3,640,822 | A | * | 2/1972 | Hrdina ................. 210/635 |
| 6,113,223 | A | | 9/2000 | Tanaka et al. |
| 6,130,098 | A | | 10/2000 | Handique et al. |
| 6,360,775 | B1 | | 3/2002 | Barth et al. |
| 6,766,817 | B2 | | 7/2004 | da Silva |

(Continued)

FOREIGN PATENT DOCUMENTS

DE    10195996 T1    10/2001

(Continued)

OTHER PUBLICATIONS

International Search Report; WO 2006/082087 A3; mailed Mar. 20, 2007; by Claus Reich.

(Continued)

*Primary Examiner*—Duane Smith
*Assistant Examiner*—Douglas J Theisen
(74) *Attorney, Agent, or Firm*—Van Dyke, Gardner, Linn & Burkhart, LLP (57) ABSTRACT

The invention relates to a device which comprises a channel (1) carrying a flowable medium. The due operation and/or maintenance of the device is associated with the formation of inclusions (3) inside the channel (1) of a fluid or gas distinct from the aforementioned medium. The channel (1) is configured in such a manner that the inclusions are moved towards a channel exit (4) by capillary forces. The invention also relates to a method for removing inclusions (3) from corresponding devices.

16 Claims, 3 Drawing Sheets

U.S. PATENT DOCUMENTS

| | | | |
|---|---|---|---|
| 6,843,281 B1 | 1/2005 | Barth et al. | |
| 6,910,339 B2 | 6/2005 | Laine et al. | |
| 6,918,404 B2 | 7/2005 | da Silva | |
| 7,066,586 B2 | 6/2006 | da Silva | |
| 2002/0062736 A1 | 5/2002 | Field et al. | |
| 2007/0144967 A1* | 6/2007 | Guenther et al. | 210/634 |

FOREIGN PATENT DOCUMENTS

| | | |
|---|---|---|
| EP | 0362889 | 4/1990 |
| EP | 0977032 A1 | 2/2000 |
| EP | 1480284 A1 | 11/2004 |
| JP | 60032255 A | 2/1985 |
| JP | 03276569 A | 12/1991 |
| JP | 05049809 A * | 3/1993 |
| JP | 05049809AA | 3/1993 |

OTHER PUBLICATIONS

E-Mail entitled "[01768] Respecting Hydrology into the Patenting System and mending a BIAS"; by Elson Silva, PhD; dated Jun. 20, 2008.

International Preliminary Report on Patentability—English Translation; PCT/EP2006/000990; mailed Aug. 9, 2007; by Yolaine Cussac.

* cited by examiner

DEVICE WITH A CHANNEL CONDUCTING A FLOWABLE MEDIUM AND A METHOD FOR REMOVING INCLUSIONS

The invention relates to a device with a channel conducting a flowable medium, thus typically a liquid or also a gas, with which a normal operation and/or a maintenance entails the formation of inclusions in the channel, according to the introductory part of the main claim. The invention further relates to a method for removing inclusions from a corresponding device, according to the introductory part of claim 15.

With a device of the known type, it may for example be the case of a fuel cell, a current collector or a bipolar plate for a fuel cell, a fuel cell stack, or a different chemical reactor or a micro-reactor. The problem of enclosed gas—or liquid bubbles in fluid structures and in particular in chemical reactors and micro-reactors, may be traced back to different causes. On the one hand, gas bubbles may arise on account of a poor ventilation of a system or due to an unfavorable geometric design, and remain in the system. On the other hand, inclusions of a gas or another fluid which is different to the medium led through the channel, may not only occur on maintenance, but also during correct operation of such a device. The outgassing of a fluid by way of heating, and a gas formation in chemical reactors due to chemical reaction may be mentioned as examples. One important example of an application with which the gas is released, is given by fuel cells. Thus for example $CO_2$ arises on the anode side with a direct-methanol fuel cell.

A formation of inclusions of the described type, although often not being able to be avoided, is however disadvantageous, since the inclusions prevent a flow of the medium led by the channel, and in some cases even a desired chemical reaction. For this reason, various paths have been suggested in the state of the art, in order to remedy such undesired inclusions, for example gas inclusions, as effectively as possible. It is thus known for example in devices of the known type, to provide channels conducting a flowable medium with through-openings which are open to a surroundings and which permit an outgassing. A comparable path has also been made to permit the exit of a gas forming the inclusions by way of system-limiting, gas-permeable membranes. In both cases, a degassing takes place at locations at which the inclusions also arise. The result is this is that a compact construction of corresponding devices is impossible, or made considerably difficult, since large, free-lying surfaces are required.

It is then the object of the present invention, to suggest a suitable device which permits a rapid and as complete as possible removal of arising inclusions of a fluid (for example a gas) even if a transport of the inclusions over longer stretches is required due to a desired compact construction. It is furthermore the object of the invention to suggest a corresponding method for removing inclusions.

According to the invention, this object is achieved by a device with the latter features of the main claim in combination with the features of the preamble, as well as by a method with the features of claim 15. Advantageous further developments and designs of the invention are to be deduced with the features of the dependent claims.

With a device suggested here with a channel conducting a flowable medium, whose correct operation and/or maintenance entails a formation of inclusions of a fluid which is different from the mentioned medium (typically a gas, possible however also a liquid) in the channel, for each cross section of the channel perpendicular to a longitudinal direction of the channel, one may specify an area A and a peripheral length l of this cross section, as well as an area A' and a length l' of a peripheral line of a coherent area lying within this cross section, wherein the latter mentioned area is defined in that a ratio A'/l' assumes a maximal value—compared to all other coherent areas lying in the cross section. According to the invention, the channel is then designed such that the ratio A'/l' and/or a ratio of area to peripheral length of the cross section of the channel itself, defined as A/l, and/or if given an inclusion, at a location of the channel defined by the cross section, between the flowable medium and the fluid forming the inclusion, a contact angle θ sets in at a channel wall, this contact angle θ, and/or if θ>π/2, a variable defined as −A/l and/or one defined as −A'/l', monotonically increases along the channel towards the channel exit. The contact angle θ also indicated as an edge angle thereby is defined here such that it lies completely in the first mentioned flowable medium outside the inclusion, so that therefore, in the case of a completely wetting flowable medium, θ=0 and for a completely wetting fluid forming the inclusions θ=π would apply. Typical embodiments of the invention, with which the mentioned condition is fulfilled by a suitable channel geometry, envisage for θ<π/2 at least one of the variables A/l or A'/l', and for θ>π/2 at least one of the variables −A/l or −A'/l'—in other words thus sign(cos θ)A/l and/or sign(cos θ)A'/l', increases monotonically along the channel towards the channel exit.

The inventive design of the channel, which is typically designed as a capillary, has the effect that capillary forces act on the inclusion in the channel, which advantageously force it towards the channel exit. Accordingly, the method according to the invention for removing inclusions from a device with a channel conducting a flowable medium, on whose operation and/or maintenance, an inclusion of a fluid (for example a bubble) forms within the channel in the flowable medium, envisages the inclusion being moved towards a channel exit by way of capillary forces. In the same manner, one may also remove a greater number of inclusions or bubbles from the device, wherein a further advantageous effect may be achieved in that an inclusion moved in the described manner by capillary forces, on its way catches further bubbles or inclusions, which under certain circumstances are not large enough themselves to be subjected to the respective capillary forces, in that the inclusion takes them up or drives them in front of itself. A movement of inclusions of the described type caused by capillary forces, for example a corresponding bubble movement, may under certain circumstances result in the desired (additional) driving of a flow of the medium led by the channel.

The mentioned edge angle θ, with given surface characteristics of the channel wall, results unambiguously from the medium led by the channel and from the fluid forming the inclusions. Since this fluid is specific to the device and may therefore be determined (for example the vapor of the flowable medium, if the latter is a liquid and the inclusions arise by way of evaporation, or a defined reaction product which arises with correct operation of the device, or air if the inclusions are produced due to the filling of the device with the flowable medium, in particular by way of refilling the medium), the edge angle θ may also be determined, and as the case may be, may also be manipulated by way of a suitable design of the channel wall. The edge angle θ may thus also be fixed in a defined manner dependent on location. By way of this, but most simply (and possibly additionally), by way of a design of the channel with a geometry changing along the channel, one may simply fulfill the condition which applies according to the invention, according to which, the ratio A'/l' and/or the ratio A/l and/or θ, and/or, if θ>π/2, at least one of the variables −A/l or −A'/l', monotonically increases along the channel toward the channel exit, which typically ends in an open manner. A profile changing along the channel (thus along the course of the channel) and/or a cross-sectional area changing along the channel and/or a peripheral length of the channel changing along the channel, are considered for this.

One preferred embodiment of the invention thereby envisages at least one of the mentioned monotonically increasing ratios or variables increasing in a strictly monotonic manner, so that advantageously capillary effects may act on the inclusions at each location of the channel in the described manner. With regard to an as simple as possible and space-saving construction, and as favorable as possible flow characteristics with low flow resistances, it is moreover advantageous if the mentioned ratios and variables thereby change along the channel only in a continuous manner. A removal of inclusions, typically an outgassing, may be achieved particularly well if the variable increasing monotonically for producing the capillary effects, increases in a strictly monotonic manner up the channel exit.

With particularly advantageous embodiments of the invention, the device forms a chemical reactor or micro-reactor or a component of such a reactor or micro-reactor. In particular, with the device, it may be the case of a current collector, a bipolar plate, a fuel cell, a fuel cell stack or a component thereof. Thereby, in particular a coolant channel and/or a channel for a reaction product and/or for a reactant or a mixture of several reactants may be designed in the described manner. In these cases, for example vapor bubbles of a coolant or inclusions of a gaseous reaction product may be removed from a corresponding system in the described manner, by way of utilizing capillary effects in a targeted manner.

On account of the design according to the invention of the respective channel, this forms a passive structure, through which the inclusions for example present as bubbles, are shaped in a manner such that a predominant direction arises, in which the inclusions (preferably exclusively) move on their own account by way of the occurring capillary effects. A transport of the inclusions may be effected in the desired manner by way of passive, fluidic structures, whilst utilizing natural capillary effects of the respective fluid or gas which in the respective channel is surrounded by the medium led in the channel.

In particular, one may profit particularly well from the described advantage if the channel—of course a respective device may also have several channels designed in such a manner—at least in stretches, runs bearing on an active surface and/or on a catalytic membrane or on another catalyser, for example on an electrolyte membrane of a fuel cell or on a catalyser bearing thereon, or on a diffusion layer adjacent thereto. In particular, a part of the channel wall may in stretches, be formed by way of a suitable layer. Typically, inclusions which are inherent to operations form in such a channel, as a rule inclusions of a reaction product which in turn hinders the reaction if they are not transported away rapidly, which is ensured by the present invention.

In particular with the use of such channels in fuel cell stacks or similar stack arrangements of chemical reactors, and in particular chemical mixing reactors, in a particularly advantageous manner, an effective removal of inclusions is achieved with a particularly compact geometry of the respective device. Thereby, the channels may be designed in a simple manner, and in a manner such that they run in a plane which is spanned by a fuel cell, in order to end at an edge of the fuel cell stack. The inclusions are then transported by the described capillary effects up to the edge of the fuel cell stack, where they may exit. By way of this, one may stack many fuel cells over one another, without the removal of the inclusions being inhibited. In this manner, the invention e.g. permits a compact construction of fuel cell systems with a simultaneously effective degassing.

It is also possible to design devices of a completely different type in the context of the present invention. Refillable ink cartridges or dye cartridges are to be mentioned, in which inclusions, typically air bubbles may form on refilling. Such a cartridge may also be equipped with preferably capillary-like channels, which are designed in the described manner and for example may lead from a storage container to the outside, so that the inclusions may escape through these channels.

According to experience, in particular, channels with a T-profile or a profile containing a T-profile permits an advantageous, low-resistance transport of inclusions. It is particularly advantageous if the at least one channel of the device of the described manner not only comprises a T-profile or a profile containing a T-profile, but additionally a transverse bar of this profile is designed such that it tapers towards at least one end, preferably towards two ends. By way of this, one may succeed in the bubbles which arise in the region of the transverse bar in the profile of the channel, likewise being driven by capillary forces towards a location at which a further bar of the profile of the channel connects to the transverse bar, and from where a particularly good continued transport of the bubbles is possible. Alternatively or additionally, one may envisage the further bar of the profile connecting to the transverse bar widening away from the transverse bar. By way of this, one may succeed in an inclusion being moved into this further bar by way of capillary forces, so that the transverse bar is kept largely free of inclusions. For that which has been stated here, one may conclude that a corresponding design is particularly advantageous if the transverse bar of the T-profile formed by the channel or contained in the channel is arranged bearing on an active surface and/or a catalytic membrane, on another catalyser or a diffusion layer. A bubble formation is then typically present mainly in a region defined by the transverse bar, whilst a removal of the bubbles may be effected largely in a region of the further bar, by which means a blockage or hindrance to a desired chemical reaction which is otherwise caused by the bubbles, is effectively prevented.

With regard to the channel, it is typically the case of a capillary. The described advantageous effects are particularly pronounced if the area A of the cross section of the channel thereby assumes values between 25,000 $\mu m^2$ and 0.25 $mm^2$ and/or a largest diameter of this cross section assumes values between 25 $\mu m$ and 1 mm.

A monotonic increase of at least one of the variables $A'/l'$, $A/l$, $\theta$, $sign(cos\ \theta)A'/l'$ or $sign(cos\ \theta)A/l$ provided according to the invention, may be realized in different manners. For example, for this, one may envisage the area of the cross section of the channel A and/or the area A' of the mentioned area lying within the cross section, increasing monotonically along the channel and preferably strictly monotonically and/or continuously towards the channel exit. Thereby, the channel under certain circumstances may have a profile which remains similar. It is however also possible for the profile to have a changing shape, and for example to be extended along a course of the channel, so that a largest diameter of the cross section of the channel and/or a dimension of this cross section monotonically increases in a direction which is perpendicular to that diameter, along the course of the channel. It may however also be advantageous for the profile of the channel to change along the course of the channel in a manner such that a ratio defined as $A/l^2$ and/or as $A'/l'^2$ monotonically increases along the channel. The profile in this case becomes bellied along the channel, by which means an increase of the ratio $A/l$ and/or A'/l' is possible not only with areas A and A' remaining the same, but even with decreasing ones.

Cross-sectional changes of the channel of the type described in the previous paragraph lead to capillary forces of the desired orientation which act on inclusions, when θ assumes a value of smaller than π/2, thus in particular when with regard to the flowable medium, it is the case of a wetting liquid. In the less typical case that θ has a value larger than π/2, thus if for example the fluid forming the inclusions has wetting properties, one may envisage the variables or ratios mentioned in the preceding paragraphs monotonically decreasing instead of increasing along the channel towards the channel exit, by which means then a monotonic increase of the variable sign(cos θ)A/l (in this case equal to −A/l) and/or sign(cos θ)A'/l' (in this case equal to −A'/l') is achieved.

Alternatively or additionally to cross sectional changes of the exemplary described type, the desired capillary effects may also be created or increased by way of the channel having channel walls with surface characteristics changing along the channel, so that the edge angle θ has a value which changes along the channel and preferably increasing towards the channel exit. Under certain circumstances, the channel may then also have a cross section which remains the same along its course. The surface characteristics which change in a defined manner, for this, may for example be realized by a coating of the channel walls which changes along the channel. If the edge angle is not to be constant within a cross section, but is to assume different values at different locations of the channel wall delimiting the cross section, then θ in the present document is always defined as the value of the edge angle averaged over the peripheral length.

In order for the capillary effects produced by the present invention to be adequately large, in order to cause a rapid movement of inclusions and thereby to overcome resistance forces, it is finally advantageous if at least one of the variables A'/l', A/l, θ, sign(cos θ)A'/l' or sign(cos θ)A/l along a channel stretch of 5 mm increases by a factor of at least 1.5, and with regard to a geometry which is simple to realized, preferably by a factor of between 2 and 3. Under certain circumstances however, even a very slight cross sectional change is sufficient in order to create the desired capillary forces of an adequate size. For example, a tilting of a channel wall or several channel walls by 0.001° (or more) with respect to a channel longitudinal direction, and the cross sectional change which this entails, is adequate for this.

Embodiment examples of the invention are hereinafter explained by way of the FIGS. 1 and 2. There are shown in.

Figure 1:
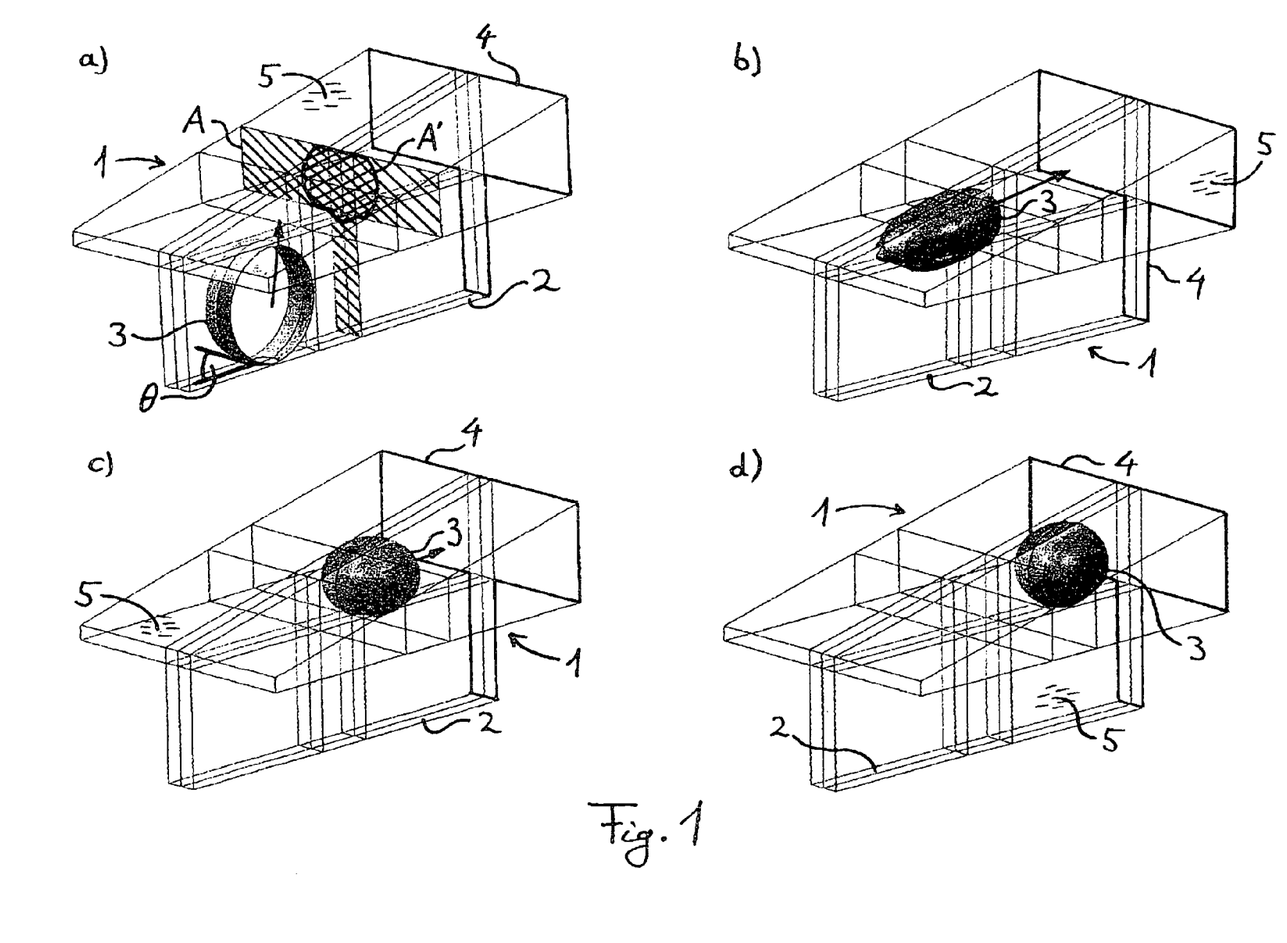
FIG. 1 a perspective view of a channel section of a device according to the invention, with an inclusion at four consecutive points in time, FIG. 2 a cross section through a channel in a different embodiment of the invention, with inclusions at six consecutive points in time, as well as a lateral view of the same channel with an inclusion at two consecutive points in time, FIG. 3 in each case, a longitudinal section through a channel of two other embodiment examples of the invention, and FIG. 4 again, in each case a longitudinal section through two channels of further embodiment examples.

The same channel 1 is represented four times in FIG. 1, which is integrated into a chemical micro-reactor which itself is not represented, and there, with a side surface 2 lying in each case at the bottom in the figure, is arranged bearing on a catalytic membrane. The channel 1 leads a flowable medium, with which in the present case, it is the case of a liquid. A directed operation of the chemical micro-reactor entails a formation of gas at the catalytic membrane, which at the side surface 2 enters into the channel 1 and forms bubbles there. An inclusion 3 formed by such a bubble is represented in FIG. 1 with the pictures indicated at a), b), c), and d) at four consecutive points in times, wherein picture b) represents a point in time 0.000755 s, picture c) 0.001175 s and picture d) 0.00301 s after the point in time shown in picture a).

With other devices designed in a similar manner, the inclusions 3 may also be formed by a fluid which may be differentiated from the medium led through the channel 1. It would also be possible for that flowable medium not to be present as a liquid, but as a gas. In the case described here, with regard to the flowable medium, it is the case of liquid reactant which is supplied to the channel 1 from an end which in each case lies at the left in FIG. 1 At an end of the channel 1 which is represented lying on the right in FIG. 1, this channel comprises a channel exit 4 ending in an open manner, through which the gas forming the inclusion 3 may escape into the surroundings of the micro-reactor.

The channel 1 has a cross section which forms a T-profile, wherein the side surface 2 terminates a further bar which projects from a transverse bar of the T-profile. On account of capillary forces which effect a minimization of a surface energy of the inclusion 3, the inclusion 3 formed on the side surface 2 firstly rises up to a location at which the mentioned further bar contacts the transverse bar, by which means the inclusion 3 is removed from the catalytic membrane bearing on the side surface 2.

Firstly now, the channel 1 has a geometry which forces the inclusion 3 into a shape in which again capillary forces act on it, which move the inclusion 3 along the channel 1 towards the channel exit 4. This geometry is characterised in that a ratio A'/l' and a ratio A/l increase in a strictly monotonic and continuous manner along the channel 1 towards the channel exit 4, wherein for each cross section of the channel 1 perpendicular to a longitudinal direction of a channel 1, the variable A is to be defined as the area, and the variable l as the peripheral length of this cross section, wherein A' is to indicate an area and l' a length of a peripheral line of a coherent area lying within this cross section, wherein this area is defined in that A'/l' compared to all other coherent areas lying in the cross section, assumes a maximal value, wherein θ is defined as the edge angle which sets in at the height of the respective cross section on the channel wall 5 between the flowable medium led by the channel 1 and the gas forming the inclusions 3 (or liquid with other embodiments of the invention) and lies completely in the first mentioned, flowable medium. In the present example, θ<π/2 applies, so that in particular sign(cos θ)=+1 and thus also the variables sign(cos θ)A'/l') and sign(cos θ)A/l increase in a strictly monotonic and continuous manner along the channel 1 towards the channel exit 4 ending in an open manner.

The monotonic increase of the mentioned variables or ratios along the channel 1 towards the channel exit 4 is realized in the present case in that the area A of the cross section of the channel 1 and thus also the area A' of the mentioned area which lies within the cross section and which corresponds to a good approximation of the area which the inclusion 3 strives to assume within the cross section, monotonically increases along the channel. One achieves an increase of those areas A and A' along the channel, in that a dimension of the cross section in a direction perpendicular to the transverse bar of the mentioned T-profile is designed in a monotonically increasing manner along the channel 1, which is realized by way of an extension of a part of the T-profile forming the transverse bar, in the direction perpendicular to the transverse bar, and a profile change which this entails. The respective part of the channel 1 forming the transverse bar of the T-profile obtains a wedge shape by way of this. Other geometries of the channel 1 with which a largest diameter of the cross section of the channel 1 and/or a dimension of this cross section in a direction perpendicular to that diameter increases monotonically along the channel, are also conceivable, in order, by way of this, to induce a movement of inclusions 3 in a predominant direction by way of capillary forces. In the present case of the channel of FIG. 1, a profile change results in the described manner, with which also a ratio defined as $A/l^2$ and as $A'/l'^2$ increases in a continuous and strictly monotonic manner along the channel 1 towards the channel exit 4.

Finally, it would also be possible to design the channel wall 5 of the channel, with surface properties changing along the channel, as an alternative or additionally to a profile change, for example by way of a location-dependent coating, so that the edge angle $\theta$ which is a function of the gas forming the inclusions 3, of the flowable medium led by the channel 1 and of the surface characteristics of the channel wall 1, has a value which changes along the channel 1, and that the inclusions 3, by way of this, are brought into a shape which causes or increases the capillary forces moving the inclusions 3 towards the channel exit 4.

The channel which is not represented true to scale in FIG. 1, is further dimensioned such that the area A of the cross section of the channel 1 at a channel beginning has a value of 25,000 $\mu m^2$, and increases over a stretch of a length of 0.7 mm along the channel 1 uniformly up to a value of 95,000 $\mu m^2$ at the channel exit 4. Thereby, the channel 1 has a width of 500 $\mu m$ which is given by a length of the transverse bar of the mentioned T-profile and is constant in the present case. A corresponding design of a capillary, with which a cross-sectional change is merely realized by a tilting of at least one of the channel walls 5 by only about 0.001°, would also be possible.

On operation of the micro-reactor which contains the illustrated channel 1, the inclusions 3, of which one is represented in FIG. 1, arise at the side surface 2, wherein gas forming the inclusions has a chemical composition which is unambiguously set on account of the reaction taking place at the side surface 2 or on the catalytic membrane bearing there, inherent of the device. At the same time, the edge angle $\theta$ which was previously used to describe characteristics of the channel 1, is also fixed. The inclusions 3 now, on account of the described geometry of the channel 1, are moved towards the channel exit 4, driven exclusively by way of capillary forces.

Capillaries conducting flowable media, of the type of the previously described channel, may also be provided in devices other than in chemical micro-reactors, for the purpose of degassing or the removal of other inclusions, for example in devices which contain refillable fluids, and with which a refilling typically entails the formation of bubbles. Refillable ink cartridges are to be mentioned as an example.

Figure 2:
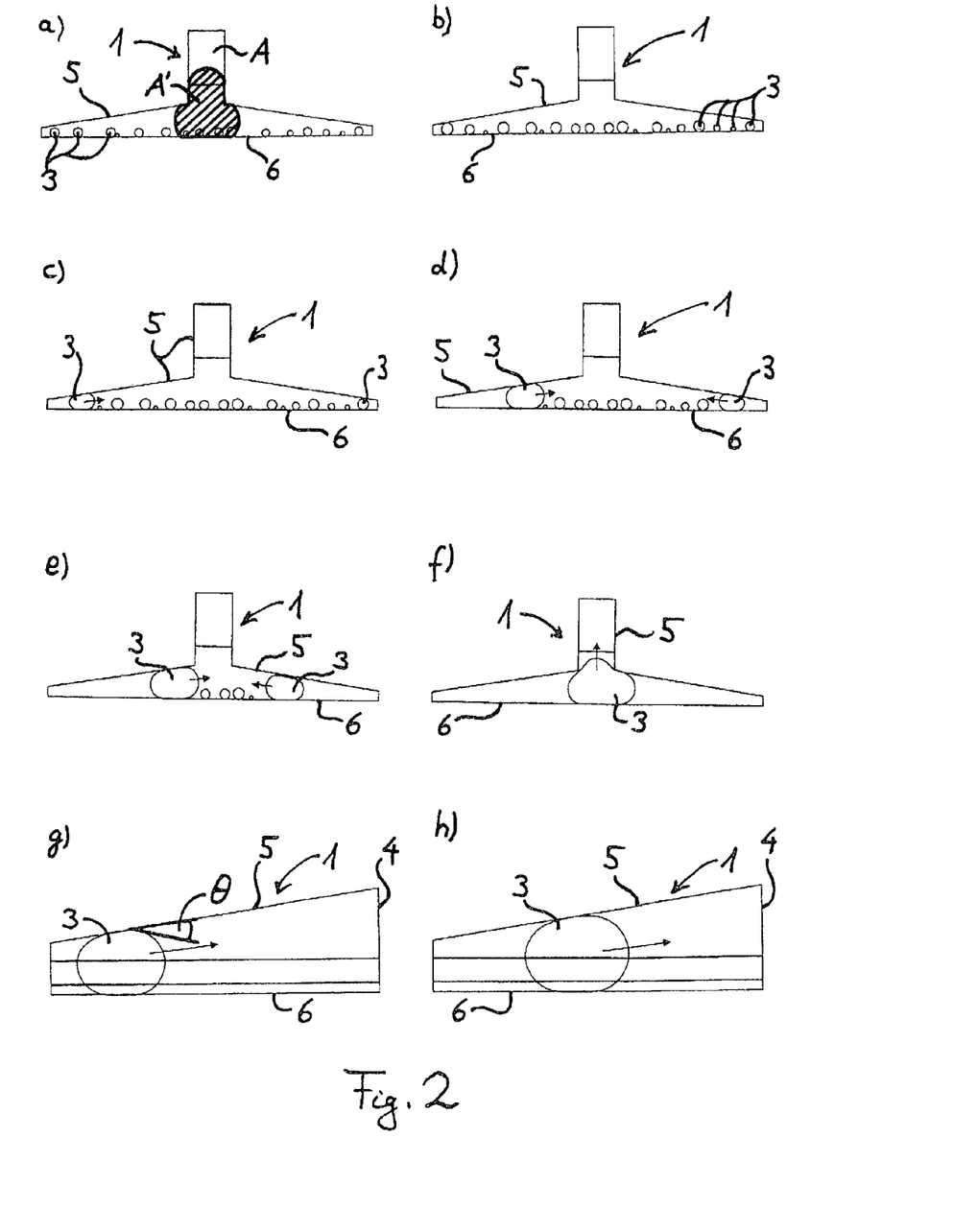

A similar channel 1 which serves for the transport of a fluid reactant in a bipolar plate of a fuel cell stack, and has dimensions similar to the previously described channel, is represented in FIG. 2 as a cross section (pictures a) to f)), and as a lateral view (pictures g) and h)). The fuel cell stack which itself is not represented, in the present case consists of direct-methanol fuel cells, wherein the imaged channel 1 serves primarily for the transport of the methanol forming the mentioned reactant.

The channel 1 again has a cross section forming a T-profile, wherein a transverse bar of this T-profile lying in each case at the bottom in FIG. 2, bears on a diffusion layer which serves as a catalyser and which for its part bears on an electrolyte membrane. This diffusion layer forms an active surface 6 at which gaseous carbon dioxide arises on operation of the fuel cell stack, said carbon dioxide forming inclusions 3 within the channel 1 which are surrounded by the methanol. The transverse bar of the T-profile has a shape which tapers to two ends, wherein a further bar pointing away from the active surface 6 projects centrally on the transverse bar. The pictures characterised at a) to f) in FIG. 2 illustrate the fact that the result of this shape of the T-profile is that the growing inclusions 3 move towards the mentioned further bar on account of capillary forces, wherein large inclusions 3 accommodate smaller inclusions 3 which they meets on the way. With other embodiments of the invention, one may envisage the mentioned further bar which connects centrally to the transverse bar of the T-profile, widening away from the transverse bar, by which means a movement of the inclusions 3 into the further bar of the T-profile and thus away from the active surface 6 may be induced on account of capillary forces. The channel 1 in a modification of the invention, may also be designed with an L-profile in a similar manner (which would result by way of leaving out one half of the transverse bar), with a limb bearing on the active surface 6.

As with the previously described example, the channel 1 represented in FIG. 2 also has a cross section A which increases in a continuous and strictly monotonic manner along the channel to a channel exit 4, wherein a ratio defined as A/l also increases in a continuous and strictly monotonic manner toward the channel exit 4, wherein l is defined as the peripheral length of the cross section of the channel 1. The inclusions 3 with the channel wall 5 form an edge angle or contact angle $\theta$ with a small value between 0 and $\pi/2$, which is why the mentioned increase of the ratio A/l and the increase in the ratio A'/l' which this entails (A' and l' are defined as explained previously in combination with FIG. 1), results in capillary effects acting on the inclusion 3 moving these towards the channel exit 4. The increase of the cross section A, and a movement of an inclusion 3 towards the channel exit 4 induced in the described manner, is illustrated in the pictured g) and h), which represent two consecutive points in time. The edge angle $\theta$ is also drawn in there at a location.

Similarly to the channel 1 described here, one may also design a coolant channel which leads a fluid coolant and in which vapor bubbles of the coolant may occur on operation of the fuel cell stack or another chemical reactor. Corresponding channels 1 may not only be arranged in bipolar pates, but also in other current collectors, for example of fuel cells.

Figure 3:
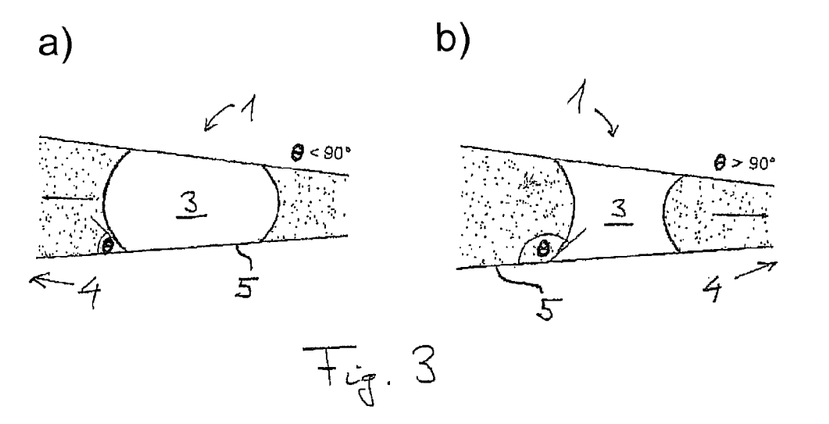
Figure 4:
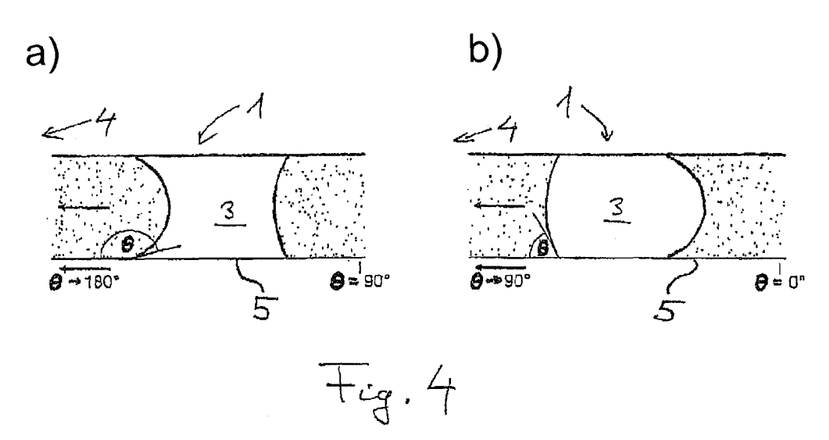

FIGS. 3 and 4 in which recurring features are again characterised by the same reference numerals, once again illustrate the described effect of a bubble transport which may be led back to capillary forces. A channel 1 with an inclusion of a fluid is shown in FIG. 3 on the left, indicated at a), and this inclusion is enclosed on the right and left by a flowable medium. The contact angle $\theta$ which is defined as lying completely in the flowable medium outside the inclusion, here is smaller than $\pi/2$, so that an increase of A/l (and A'/l') towards the channel exit 4 (here to the left) effects a bubble transport in this direction. Another channel 1 from another device is represented on the right in the same FIG. 3, indicated at b), in which inclusions 3 form in a similar manner, with which however a contact angle $\theta$ which is larger than $\pi/2$ sets in. Here, a reduction of A/l (and A'/l') towards the channel exit 4 (now lying to the right), has the effect of the inclusion 3 being moved to there.

FIG. 4 with two examples, on the left at a) for $\theta > \pi/2$ and on the right at b) for $\theta < \pi/2$, illustrates as to how a corresponding effect may also be achieved with a constant channel cross section by way of locally dependent values of $\theta$. In both cases, an increase of $\theta$ towards the channel exit 4 (in each case lying on the left) effects a force acting on the respective inclusion 3 which moves this towards the channel exit 4. In all outlined cases, the movement is created by way of different capillary forces at the two opposite ends of the respective inclusion 3, which is reflected in the different curvatures of the meniscuses delimiting the inclusions. This effect, with the examples of FIG. 3, is caused by the channel geometry, and with the examples of FIG. 4 by a location-dependent contact angle θ which may be realized by a surface coating of the channel wall 5 changing along the channel 1. Of course, the effects described by way of FIGS. 3 and 4 may also be superimposed (by a combination of the features).

With the present invention after, all which has been stated, it is particularly suggested to utilize geometric structures for the transport of gas bubbles, in that the geometry of fluid-conducting channels 1 is designed according to the respective requirements. If for example a side wall 2 of the channel 1 is formed by a membrane, at which a reaction takes its course, which for example produces a gas, which is to be removed as quickly as possible, then the channel geometry may be designed to the extent that the gas is transported away from the membrane alone on account of capillary forces. Structures of the type presented here, may thus be utilized for the passive removal of gas volumes, wherein the channels 1 define a predominant direction, and may be utilized for the passive transport also over longer stretches. Thereby, no externally acting forces and thus also no respective external components such as pumps for example are required for the expulsion of gas bubbles. FIGS. 1 and 2 are based on numerical flow simulations, and show how gas volumes which form the inclusions 3, in each case move into a certain section of a cross section on account of a minimization of the surface energies, and there is forced into a movement along the channel 1 on account of different capillary pressures. This movement typically lasts up to detachment of the respective gas volume from the channel walls 5 at a channel exit 4, since an energetic minimum is then achieved.

It is therefore particularly suggested to apply passive systems of the type described here, for the transport of a phase (typically gas) forming an inclusion, in chemical reactor systems. Typical reactors which are suitable for the application of such structures are for example catalytic reactors such as fuel cells with catalytic membranes on which gas bubbles continuously arise. A blocking of an active membrane surface is prevented due to the rapid transport away of the gas bubbles, in that this membrane surface is cleared empty. The arising gas bubbles, with the help of a specially adapted geometry of the channels 1, autonomously ensure a periodic cleaning of the membrane surface from gas bubbles. This method ensures a maximal free reaction surface, an automatic refilling of the reactor with the respective reactants, and thus provides great advantages compared to the state of the art.

The geometric structures by way of which the desired capillary effects for the passive transport of the phase forming is created, may also include webs and narrowings or be realized by way of such. Thereby, the geometry should be of a nature such that the phase forming the bubbles, driven by a surface tension of the arising bubbles, moves in a predominant direction on account of the geometry and on account of the surface nature of the geometric structures, wherein a transport of the bubbles is effected typically in an exclusively passive manner, i.e. merely driven by the capillary forces at phase limits.

The subject-matter of the invention which is suggested in the present application may be formulated in a particularly simple manner using the term of the hydraulic diameter. Thereby, the hydraulic diameter of a cross-sectional area is defined as $A/l$, when this cross-sectional area has an area $A$ and a peripheral length $l$. The variable defined further above as $A'/l'$ indicates the largest inscribable hydraulic diameter at the respective location of the channel. The subject-matter of the present invention may thus be defined as a device with a channel conducting a flowable medium, with which a directed operation and/or maintenance of the device entails the formation of inclusions of a fluid (typically a gas) in the channel, which fluid may be differentiated from the mentioned medium, wherein a hydraulic diameter of the channel and a largest inscribable hydraulic diameter may be specified for each cross section which is perpendicular to the longitudinal direction of the channel, wherein the device is characterized in that (a) the hydraulic diameter of the channel and/or the largest inscribable hydraulic diameter monotonically increases along the channel towards a channel exit, or that (b) with an inclusion between the flowable medium and the fluid forming the inclusion, at a channel wall, in each case a contact angle θ defined as lying completely in the flowable medium outside the inclusion sets in, and this contact angle θ monotonically increases along the channel towards a channel exit or that (c) with an inclusion between the flowable medium and the fluid forming the inclusion, at a channel wall, a contact angle θ defined as lying completely in the flowable medium outside the inclusion sets in, for which $\theta > \pi/2$, and the hydraulic diameter of the channel or the largest inscribable hydraulic diameter monotonically reduces along the channel towards a channel exit. Thereby, the features (a) and (b) or the features (b) and (c) may also be realized at the same time.

Preferably thereby, furthermore the respective indicated variable should increase, and in the last mentioned case should decrease, towards the channel exit, in a strictly monotonic and/or continuous manner. Thereby, embodiments of the invention with which the respective variable changes in the mentioned manner at each location of the channel up to the mentioned channel end—preferably in a continuous manner, are particularly preferred.

The contact angle θ used for the definition of the subject-matter of the invention thereby is to be understood as a feature of the device, since this contact angle θ results unambiguously from the channel wall material, the type of flowable medium and the type of the fluid forming the inclusions, wherein this fluid in turn may be unambiguously determined on account of the device. In a typical case, with regard to the device, it would typically be the case of a fuel cell or a component part of a fuel cell (for example a bipolar plate), wherein the flowable medium may in turn be a defined coolant or a reactant. The fluid forming the inclusions is then either a vapor formed by the flowable medium (in the first case) or an unambiguously definable reaction product (in the second mentioned case). The monotonic change of the contact angle θ along the length of the channel which is required in one variant of the invention, may be implemented by the man skilled in the art without any problem and without further ado, as is the channel wall to be designed with characteristics changing along the channel.

The most typical case is however formed by the embodiment of the invention with which the hydraulic diameter of the channel, and/or the largest inscribable hydraulic diameter along the channel increases monotonically towards a channel exit, preferably in a strictly monotonic and/or continuous manner.

The invention claimed is:

1. A device with a channel for removing fluid inclusions formed in the device from a flowable medium in the device, wherein the channel runs bearing on an active surface or on a catalytic membrane or on a catalyser, the channel comprising a channel exit, wherein the channel defines an hydraulic diameter and a largest-inscribable hydraulic diameter at any one of a plurality of cross-sections defined perpendicularly to a longitudinal direction of the channel, the fluid inclusion being urged toward the channel exit by a capillary force, and the channel including at least one of the following:
   (a) the hydraulic diameter or the largest-inscribable hydraulic diameter monotonically increases toward the channel exit; or
   (b) a channel wall, the inclusion being located between the flowable medium and the channel wall and defining a contact angle θ between the channel wall and the inclusion, the contact angle θ lying completely in the flowable medium outside the inclusion, and the contact angle θ monotonically increasing as the inclusion moves along the channel toward the channel exit; or
   (c) a channel wall, the inclusion being located between the flowable medium and the channel wall and defining a contact angle θ between the channel wall and the inclusion, the contact angle lying completely in the flowable medium outside the inclusion, for which θ>π/2, and wherein the hydraulic diameter or the largest inscribable hydraulic diameter monotonically decreases along the channel towards the channel exit.

2. A device according to claim 1, wherein at least one of the hydraulic diameter or the largest-inscribable hydraulic diameter or the contact angle θ increases in a continuous manner.

3. A device according to claim 1, the device comprising one chosen from a current collector, a bipolar plate, a fuel cell, a fuel cell stack, a component of a current collector, a component of a bipolar plate, a component of a fuel cell, and a component of a fuel cell stack.

4. A device according to claim 1, wherein the channel comprises a coolant channel or a channel for a reaction product or a reactant.

5. A device with a channel for removing fluid inclusions formed in the device from a flowable medium in the device, wherein the channel has a T-profile or a profile containing a T-profile, the channel comprising a channel exit, wherein the channel defines an hydraulic diameter and a largest-inscribable hydraulic diameter at any one of a plurality of cross-sections defined perpendicularly to a longitudinal direction of the channel, the fluid inclusion being urged toward the channel exit by a capillary force, and the channel including at least one of the following:
   (a) the hydraulic diameter or the largest-inscribable hydraulic diameter monotonically increases toward the channel exit; or
   (b) a channel wall, the inclusion being located between the flowable medium and the channel wall and defining a contact angle θ between the channel wall and the inclusion, the contact angle θ lying completely in the flowable medium outside the inclusion, and the contact angle θ monotonically increasing as the inclusion moves along the channel toward the channel exit; or
   (c) a channel wall, the inclusion being located between the flowable medium and the channel wall and defining a contact angle θ between the channel wall and the inclusion, the contact angle lying completely in the flowable medium outside the inclusion, for which θ>π/2, and wherein the hydraulic diameter or the largest inscribable hydraulic diameter monotonically decreases along the channel towards the channel exit.

6. A device according to claim 5, wherein the T-profile has a transverse bar which tapers towards at least one end, or to which a further bar widening away from the transverse bar connects.

7. A device according to claim 1, wherein the channel has a T-profile or a profile containing a T-profile and wherein the T-profile comprises a transverse bar bearing on the active surface or on the catalytic membrane or the catalyser.

8. A device according to claim 1, wherein the area A of the cross-section of the channel assumes values between $25,000 \mu m^2$ and $0.25 mm^2$.

9. A device according to claim 1, wherein the area A of the cross-section of the channel monotonically increases along the channel.

10. A device according to claim 1, wherein a largest diameter of the cross section of the channel or a dimension of the cross-section in a direction perpendicular to this diameter, monotonically increases along the channel.

11. A device according to claim 1, wherein the channel has channel walls with surface characteristics changing along the channel, so that the contact angle θ has a value changing along the channel.

12. A method for removing inclusions from a device with a channel conducting a flowable medium, wherein the device comprises one chosen from: a chemical reactor, a micro-reactor, a component of a chemical reactor, and a component of a micro-reactor, the method comprising:
   providing a channel exit at the channel;
   operating the device;
   forming at least one inclusion of a fluid in the flowable medium within the channel;
   moving the inclusion towards the channel exit by capillary forces.

13. The method according to claim 12, wherein the moving the inclusion towards the channel exit by capillary forces includes one of the following:
   (a) continuously increasing the hydraulic diameter of the channel or the largest inscribable hydraulic diameter along the channel towards the channel exit;
   (b) continuously increasing a contact angle θ along the channel towards the channel exit, wherein the contact angle θ is between the flowable medium and the fluid forming the inclusion, at a channel wall, in each case the contact angle θ defined as lying completely in the flowable medium outside the inclusion; or
   (c) continuously decreasing an hydraulic diameter of the channel or a largest inscribable hydraulic diameter along the channel towards the channel exit, wherein a contact angle θ between the flowable medium and the fluid forming the inclusion, at a channel wall, the contact angle θ defined as lying completely in the flowable medium outside the inclusion sets in, for which θ>π/2.

14. A device which comprises one chosen from a chemical reactor, a micro-reactor, a component of a chemical reactor, and a component of a micro-reactor, the device comprising a channel for removing fluid inclusions formed in the device from a flowable medium in the device, the channel comprising a channel exit, wherein the channel defines an hydraulic diameter and a largest-inscribable hydraulic diameter at any one of a plurality of cross-sections defined perpendicularly to a longitudinal direction of the channel, the fluid inclusion being urged toward the channel exit by a capillary force, and the channel including at least one of the following:

(a) the hydraulic diameter or the largest-inscribable hydraulic diameter monotonically increases toward the channel exit; or (b) a channel wall, the inclusion being located between the flowable medium and the channel wall and defining a contact angle θ between the channel wall and the inclusion, the contact angle θ lying completely in the flowable medium outside the inclusion, and the contact angle θ monotonically increasing as the inclusion moves along the channel toward the channel exit; or (c) a channel wall, the inclusion being located between the flowable medium and the channel wall and defining a contact angle θ between the channel wall and the inclusion, the contact angle lying completely in the flowable medium outside the inclusion, for which $\theta > \pi/2$, and wherein the hydraulic diameter or the largest inscribable hydraulic diameter monotonically decreases along the channel towards the channel exit.

15. A device according to claim 1, wherein a largest diameter of the cross section assumes values between 25 μm and 1 mm.

16. A device according to claim 1, wherein at least one of the hydraulic diameter or the largest-inscribable hydraulic diameter or the contact angle θ increases in a strictly monotonic manner.

* * * * *